United States Patent [19]

Vedder

[11] Patent Number: 4,953,927
[45] Date of Patent: Sep. 4, 1990

[54] LENS ASSEMBLY FOR LONG-LIFE LASER IMAGING SYSTEM

[75] Inventor: Hans J. Vedder, Puchheim, Fed. Rep. of Germany

[73] Assignee: Agfa-Gevaert AG, Leverkusen, Fed. Rep. of Germany

[21] Appl. No.: 279,570

[22] Filed: Dec. 2, 1988

[30] Foreign Application Priority Data

Dec. 23, 1987 [DE] Fed. Rep. of Germany ....... 3742837

[51] Int. Cl.$^5$ .......................... G02B 26/10; G02B 3/06
[52] U.S. Cl. ...................................... 350/6.8; 350/433
[58] Field of Search .................... 350/6.5, 6.0, 6.7, 6.8, 350/6.9, 6.91, 501, 433, 486

[56] References Cited

U.S. PATENT DOCUMENTS 4,054,360 10/1977 Oosaka et al. ........................ 350/6.8
4,281,889 8/1981 Noguchi ................................ 350/6.8

OTHER PUBLICATIONS

Laser-Optical System of the IBM 3800 Printer by J. M. Fleischer IBM Journal of Research Developments, vol. 21, No. 5, Sep. 1977, pp. 479–483.

Primary Examiner—Bruce Y. Arnold
Assistant Examiner—Ronald M. Kachmarik
Attorney, Agent, or Firm—Michael J. Striker

[57] ABSTRACT

A system for imaging a line comprises a laser for emitting a modulated laser-light beam, an image-receiving surface, and a reflective element between the laser and the surface for deflecting the beam in an x-direction of the line to be imaged onto the surface. A lens assembly including a cylinder lens is provided between the laser and the element for focussing the beam on the element and a telescopic lens system is provided between the reflective element and the surface and including an upstream lens spaced by its focal length downstream from the reflective element and a downstream lens focussed downstream. Another simple cylinder lens is provided between the upstream and downstream lenses having a refractive power perpendicular to the x-direction. A projecting lens between the downstream lens and the image surface receives the beam from the downstream lens and focusses it on the surface. The middle lens has a refractive power perpendicular to the beam traversing it.

2 Claims, 4 Drawing Sheets

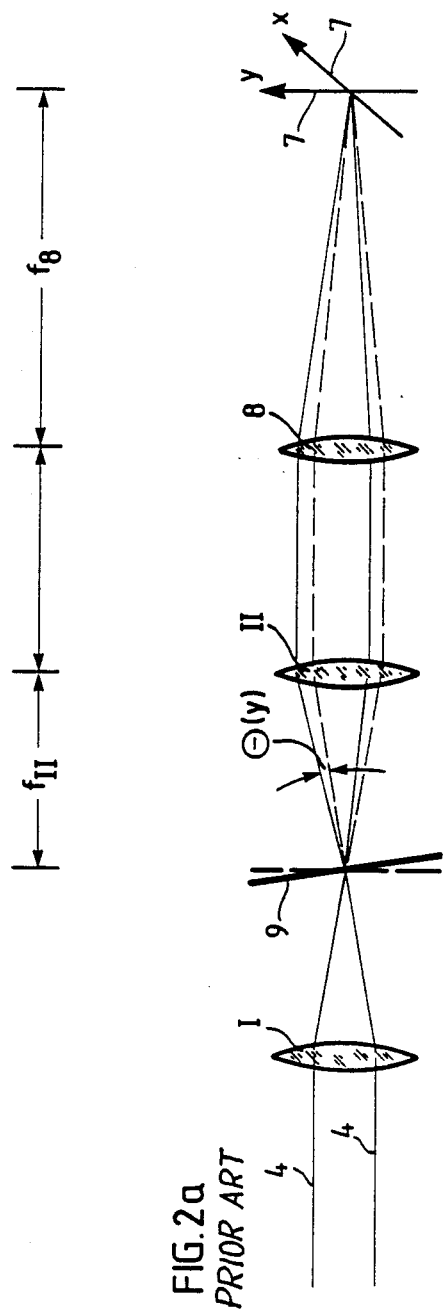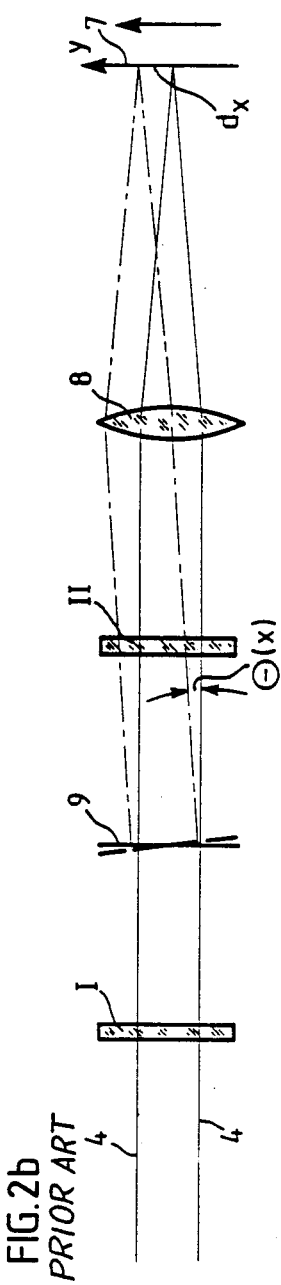
FIG. 2a
PRIOR ART
FIG. 2b
PRIOR ART

LENS ASSEMBLY FOR LONG-LIFE LASER IMAGING SYSTEM

FIELD OF THE INVENTION

The present invention relates to a laser imaging system. More particularly this invention concerns a lens assembly used in a laser system for imaging long lines.

DESCRIPTION OF THE DRAWING

In the drawing:

FIGS. 2a and 2b are largely schematic side and top views of prior-art laser-scanning systems for scanning a short line;

BACKGROUND OF THE INVENTION

A system for imaging lines normally has a laser for emitting a modulated laser-light beam, an image-receiving surface, and a reflective element between the laser and the surface for deflecting the beam onto the surface. This element normally is a polygonal mirror, a simple oscillating mirror, or a so-called hologon disk. The surface is normally stepped in the y-direction transverse to the x-direction of the line being printed, it being understood that the line can be a text or graphic image strip. A first lens assembly including a cylinder lens, that is a lens one of whose surface is part cylindrical and whose other surface is normally planar, between the laser and the element focusses the beam on the element and a second lens assembly including another cylinder lens is provided between the element and the surface to focus the beam on the surface. These cylinder lenses are set up to correct so-called cross-scan errors created by imperfections in the surface of the reflective element, and to compensate out errors created by irregular movement of this element.

Figure 1:
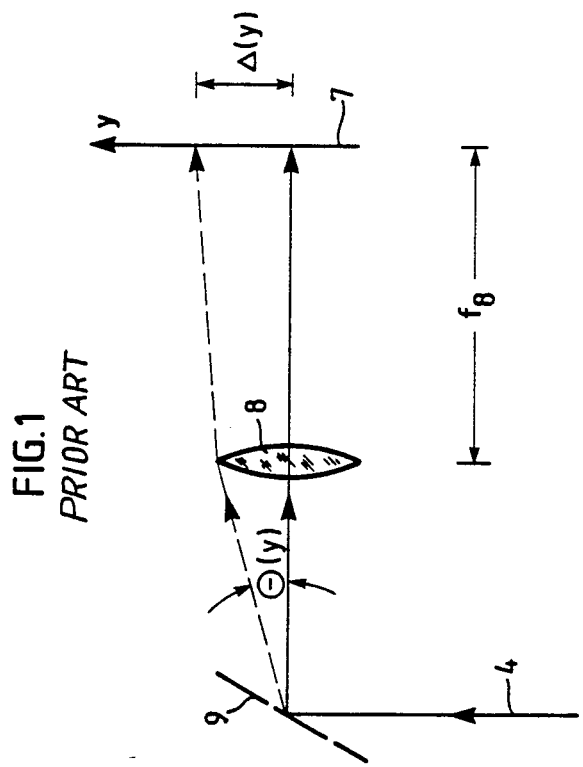
FIG. 1 is a schematic side view illustrating side-scan error.
Figure 3:
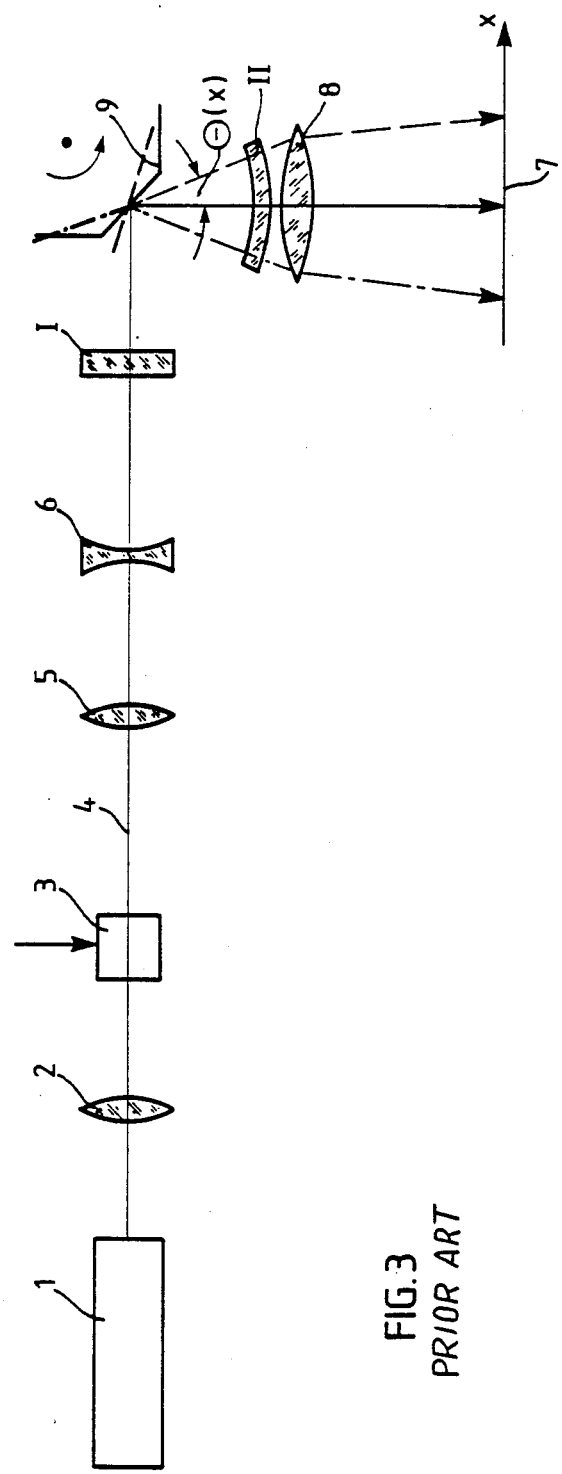
FIG. 3 is a schematic top view of a prior-art scanning system for scanning a long line usign a toroidal lens.

More particularly as illustrated in FIGS. 1 through 3 a gas or solid laser 1 emits a beam 4 that it projects through a lens 2 on an acoustic/optical modulator 3, a so-called AOM. A high-frequency voltage is applied to the crystal of the modulator 3 to produce therein an ultrasonic vibration which induces a periodic variation in its refractive index, a phase-grating effect. This effect bends a part of the incident beam out of its original propagation direction. When the amplitude of the applied high-frequency voltage is modulated with the rate of the data being imaged, the deflection corresponds to the scan rate of this data. The intensity of the thus deflected beam, the so-called first-order component, is therefore also modulated in the modulator 3. This modulation can be of the on/off binary type, or can be analog, that is for line scanning or dither scanning. The increase time of the intensity-modulated laser-beam pulses is proportional to the size of the diameter of the laser beam in the modulator crystal, which necessitates a focusing in the modulator 3. The undeflected part, the so-called O-order component, of the beam is normally blocked by a shutter downstream of the modulator.

The laser 1, lens 2, and modulator 3 can be replaced by a laser diode which is directly modulatable. Such a laser diode can directly project a modulated laser beam.

After leaving the modulator 3 the first-order component of the laser beam 4 is passed through a telescopic lens system comprised of a broadening lens 5 and a narrowing lens 6 that together produce a parallel-light beam of a diameter $D_L$. Subsequently a spot of diameter $d_s$ is produced in accordance with the formula:

$$d_s = 1.27 \cdot l \cdot f_8 / D_L,$$

wherein l is the wave length of the laser light and $f_8$ is the focal length of a projection lens 8 that casts the light on an image surface 7.

Downstream of the telescopic lens system there is in the beam 4 a deflecting element 9, either a polygonal mirror, an oscillating mirror, or a hologon disk. The beam 4 falling on the element 9 is not only deflected in the desired x-direction horizontally, that is parallel to the line to be imaged, but also vertically in the y-direction because of static and dynamic errors introduced by the element 9. More particularly the element 9 may have surface imperfections or its planar facets, when a polygonal mirror, can be flawed or improperly relatively positioned, or the element can be rotating or even nutating about an improperly aligned axis.

Thus as seen in FIG. 1 when the deflected beam, after passing the deflecting element 9, falls on the projecting lens 8 it produces in the image plane 7 a vertical cross-scan error d(y) (d=delta) determined by the formula:

$$d(y) = f_8 \cdot \theta(y),$$

wherein $\theta(y)$ is the vertical angle of the error of the beam created by the error introduced by the element 9.

When producing a large-format image, that is with a projecting lens with a long focal length, this error can exceed the permissible maximum of a few arc seconds by from 1% to 20%.

As shown in FIGS. 2a, 2b, 3, and 4 it is known to correct the cross-scan error $\theta(y)$ by using a pair of cylinder lenses I and II, one before and one after the deflecting element 9. Both lenses I and II are set up so that their powers of refraction are perpendicular to the desired deflection direction x. The first cylinder lens I thus produces a focus of the incident light perpendicular to the deflection direction x on the reflecting surface of the element 9.

In the system of FIGS. 2a and 2b the second cylinder lens II is arranged directly downstream of the deflecting element 9, that is with nothing intervening, in order that the beam 4 that is now focussed in one direction is again made parallel before it falls on the projecting lens 8. This exactly compensates for the cross scan error d(y) so long as the focal lengths $F_I$ and $F_{II}$ of the lenses I and II lie exactly on the deflecting facets of the element 9. If, however, the polygonal-mirror deflecting element 9 is deflected radially while it rotates this is not the case so that the correction is not as good. In this case the correction of the cross-scan error d(y) is determined by the formula:

$$K = d(s)/f_{II},$$

wherein K is the degree of correction, d(s) is a value proportional to the deviation of the reflecting surface from the focus of the cylinder lens, and $F_{II}$ is the focal length of the second lens II.

With larger scan angles $\theta(x)$ the second cylinder lens must be constituted as a toroid as described by J. M.

Fleischer et al in the *IBM Journal of Research Developments* (Pages 479 through 483, September 1977), that is as a cylinder lens curved perpendicular to the axis of the power of refraction, in order to ensure a planar imaging surface after the projecting lens, as shown in FIG. 3. Cylinder lenses as shown in FIG. 2b produce as a result of the steep transmission angle of the continuously moving beam 4 at the end of a line ever larger spot diameters and hence lead to a curved image field. Toroids are used to correct this circumstance which cannot be tolerated. The beam 4 is not influenced in the plane perpendicular to the refraction of the cylinder lenses I and II by the toroid, so that horizontal scanangle deflections are not changed by this style of correction.

The production of the necessary toroids II is however very difficult. Thus such toroids are very expensive, so that they add greatly to the cost of a laser-imaging system that is to faithfully reproduce even long image lines.

OBJECTS OF THE INVENTION

It is therefore an object of the present invention to provide an improved laser-imaging system.

Another object is the provision of an improved downstream lens assembly for a laser-imaging system which overcomes the above-given disadvantages, that is which accurately produces even long lines of image without the use of a toroid.

SUMMARY OF THE INVENTION

A system for imaging a line comprises a laser for emitting a modulated laser-light beam, an image-receiving surface, and a deflecting element between the laser and the surface for deflecting the beam in an x-direction of the line to be imaged onto the surface. A lens assembly including a cylinder lens is provided between the laser and the element for focussing the beam on the element and according to this invention a telescopic lens system is provided between the deflecting element and the surface and including an upstream lens spaced by its focal length downstream from the deflecting element and a downstream lens focussed downstream. Another simple cylinder lens is provided between the upstream and downstream lenses and having a refractive power perpendicular to the x-direction. A projecting lens between the downstream lens and the image surface receives the beam from the downstream lens and focusses it on the surface. The middle lens can also have a refractive power perpendicular to the beam traversing it.

By placing the second cylinder lens in a telescopic lens system the beam runs parallel to the optical axis of the system regardless of the deflection angle of the beam. As a result the beam always falls perpendicular to the refraction so that additional beam deflection in the line direction and its consequences are eliminated. This eliminates the need for a toroidal lens.

SPECIFIC DESCRIPTION

Figure 4:
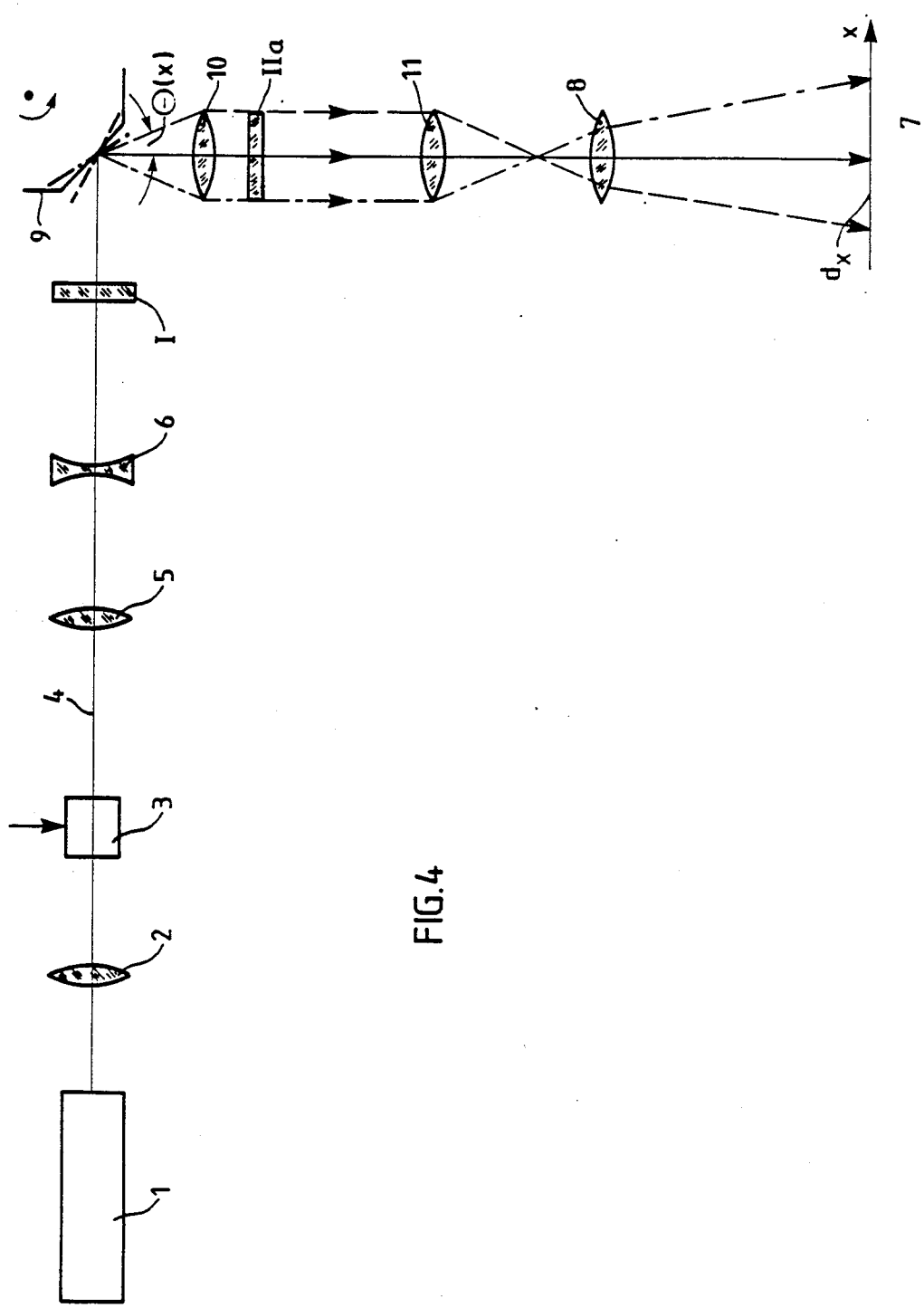
FIG. 4 is a schematic view illustrating the system of this invention.

As seen in FIG. 4 the use of a toroid such as shown at II in FIG. 3 is avoided by inserting a second telescopic-lens assembly 10, IIa, and 11 of the relay-lens type between the deflecting element 9 and the projecting lens 8. Within this system 10, 11 the beam runs always parallel to the optical axis independently of the scan angle $\theta(x)$ of the deflecting element 9. As a result the beam always falls perpendicularly on the cylinder lens II in the plane x perpendicular to its power of refraction. This means that the horizontal beam deflection is eliminated within the telescopic system 10,11 so that only a simple cylinder lens IIa, not a toroidal lens, can be used even with very long scan lines in the x-direction.

The projecting element is a lens 8 which is so constructed that the vertical spacing $d_x$ of the laser spot from the optical axis 7 is determined by the formula:

$$d_x = f_8 \cdot \theta(x),$$

wherein $f_8$ is the focal length of the projecting lens 8 and $\theta(x)$ the horizontal scan angle depending on the rotation of the deflecting element 9. As a result the scan speed and scan location are always proportional to the scan angle $\theta(x)$. Only writing of a line will take place in the image plane x by horizontal scanning. The line advance, that is the writing of a page, is effected by simultaneous advance of the image carrier in the y-direction.

What is claimed is:

1. A system for imaging a line, the system comprising:
   means including a laser for emitting a modulated laser-light beam;
   an image-receiving surface;
   means including a deflecting element between the laser and the surface for deflecting the beam in an x-direction of the line to be imaged onto the surface;
   a lens assembly including a cylinder lens between the laser and the deflecting element for focussing the beam on the deflecting element; and
   a telescopic lens system between the deflecting element and the surface and including an upstream lens spaced by its focal length downstream from the deflecting element and a downstream lens focussed downstream;
   a middle lens between the upstream and downstream lenses, constituted as a simple cylinder lens, and having a refractive power perpendicular to the x-direction, and
   a projecting lens between the downstream lens and the image surface receiving the beam from the downstream lens and focussing it on the surface.

2. The imaging system defined in claim 1 wherein the middle lens has a refractive power perpendicular to the beam traversing it.

* * * * *